(12) United States Patent
Larsson et al.

(10) Patent No.: US 9,356,760 B2
(45) Date of Patent: May 31, 2016

(54) METHOD AND APPARATUS FOR HYBRID AUTOMATIC REPEAT REQUEST SIGNALING

(71) Applicant: Telefonaktiebolaget L M Ericsson (publ), Stockholm (SE)

(72) Inventors: Daniel Larsson, Vallentuna (SE); Jung-Fu Cheng, Fremont, CA (US); Erik Eriksson, Linköping (SE); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 13/994,466

(22) PCT Filed: May 8, 2013

(86) PCT No.: PCT/SE2013/000067
§ 371 (c)(1),
(2) Date: Jun. 14, 2013

(87) PCT Pub. No.: WO2013/169167
PCT Pub. Date: Nov. 14, 2013

(65) Prior Publication Data
US 2014/0078981 A1 Mar. 20, 2014

Related U.S. Application Data

(60) Provisional application No. 61/645,476, filed on May 10, 2012.

(51) Int. Cl.
*H04L 1/18* (2006.01)
*H04L 1/16* (2006.01)
(Continued)

(52) U.S. Cl.
CPC .......... *H04L 5/0055* (2013.01); *H04L 1/1607* (2013.01); *H04L 1/1861* (2013.01)

(58) Field of Classification Search
CPC .......... H04W 72/042; H04W 72/1289; H04W 72/14
USPC ........................................................ 370/329
See application file for complete search history.

(56) References Cited

U.S. PATENT DOCUMENTS

2009/0213769 A1* 8/2009 Shen et al. ..................... 370/280
2011/0013552 A1* 1/2011 Ali ..................... H04B 7/15521
370/315

(Continued)

FOREIGN PATENT DOCUMENTS

WO 2013025143 A1 2/2013
WO 2013025150 A1 2/2013

OTHER PUBLICATIONS

3rd Generation Partnership Project. 3GPP TS 36.213 V10.4.0 (Dec. 2011). 3rd Generation Partnership Project; Technical Specification Group Radio Access Network; Evolved Universal Terrestrial Radio Access (E-UTRA); Physical layer procedures (Release 10). Dec. 2011, pp. 1-125.

(Continued)

*Primary Examiner* — Asad Nawaz
*Assistant Examiner* — Jason Harley
(74) *Attorney, Agent, or Firm* — Murphy, Bilak & Homiller, PLLC

(57) ABSTRACT

In one aspect, the teachings herein provide a system and method for reusing the PUCCH format 3 to address the new HARQ-ACK feedback cases encountered in Rel-11, where different UL/DL configurations are involved in the CA configuration of a UE, such as Rel-11 interband TDD CA with different UL/DL configurations on different bands. The various embodiments illustrated by way of example in this disclosure enable reliable and efficient HARQ-ACK feedback for Rel-11 TDD CA without a substantial increase in specification and implementation complexity.

11 Claims, 8 Drawing Sheets

(51) Int. Cl.
*H04W 72/14* (2009.01)
*H04L 5/00* (2006.01)

(56) References Cited

U.S. PATENT DOCUMENTS

| | | | | |
|---|---|---|---|---|
| 2011/0103323 A1* | 5/2011 | Wang | | H04L 1/0026 370/329 |
| 2011/0255484 A1 | 10/2011 | Zhang et al. | | |
| 2012/0020310 A1* | 1/2012 | Ji et al. | | 370/329 |
| 2012/0243462 A1* | 9/2012 | Bucknell et al. | | 370/315 |
| 2013/0034029 A1* | 2/2013 | Lee | | 370/280 |
| 2013/0083742 A1 | 4/2013 | Baldemair et al. | | |
| 2013/0201841 A1* | 8/2013 | Zhang et al. | | 370/252 |

OTHER PUBLICATIONS

Huawei et al., "Coding and resource mapping for UCI on PUSCH," 3GPP TSG RAN WGI meeting #63bis, RI-110009, Jan. 17-21, 2011, pp. 1-5, Dublin, Ireland.

New Postcom, "HARQ-ACK bundling for uplink control signalling enhancement," 3GPP TSG RAN WG1 Meeting #68bis, R1-121342, Mar. 26-30, 2012, Jeju, Korea.

Samsung, "HARQ-ACK feedback for TDD configuration 5," 3GPP TSG RAN WG1 #68bis, R1-121607, Mar. 26-30, 2012, Jeju, Korea.

* cited by examiner

TABLE 1

| UL-DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | 13, 12, 9, 8, 7, 5, 4, 11, 6 | | | | | | | | |
| 6 | | | 7 | 7 | 5 | | | 7 | 7 | |

TABLE 2

| UL-DL configuration for SCell PDSCH HARQ timing reference | | SCell SIB1 UL-DL configuration | | | | | | |
|---|---|---|---|---|---|---|---|---|
| | | 0 | 1 | 2 | 3 | 4 | 5 | 6 |
| PCell SIB1 UL-DL configuration | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

*FIG. 8*

METHOD AND APPARATUS FOR HYBRID AUTOMATIC REPEAT REQUEST SIGNALING

RELATED APPLICATIONS

This application claims priority to the U.S. provisional patent application filed on 10 May 2012 and identified by Application Ser. No. 61/645,476, which is incorporated herein.

TECHNICAL FIELD

The present invention relates to systems and methods for Hybrid Automatic Repeat reQuest, HARQ, feedback using Physical Uplink Control Channel, PUCCH, for interband Time Division Duplex, TDD, carrier aggregation with different Uplink/Downlink, UL/DL, configurations on different bands.

BACKGROUND

Carrier aggregation or CA is one of the new features recently developed by the members of the 3rd-Generation Partnership Project, 3GPP, for so-called Long Term Evolution, LTE, systems, and is standardized as part of LTE Release 10, referred to as "LTE Rel-10" or simply "Rel-10", which is also known as LTE-Advanced. Rel-8 is an earlier version of the LTE standards and it supports bandwidths up to 20 MHz. In contrast, LTE-Advanced supports bandwidths up to 100 MHz. The very high data rates contemplated for LTE-Advanced require an expansion of the transmission bandwidth.

To maintain backward compatibility with Rel-8 mobile terminals, the available spectrum in Rel-10 is divided into chunks called component carriers, or CCs, where each CC is Rel-8 compatible. CA enables bandwidth expansion beyond the limits of LTE Rel-8 systems by allowing mobile terminals to transmit data over an "aggregation" of multiple Rel-8 compatible CCs, which together can cover up to 100 MHz of spectrum. This approach to CA ensures compatibility with legacy, Rel-8 mobile terminals, while also ensuring efficient use of the wider carrier bandwidths supported in Rel-10 and beyond by making it possible for the legacy mobile terminals to be scheduled in all parts of the wideband LTE-Advanced carrier.

The number of aggregated CCs, as well as the bandwidth of the individual CCs, may be different for uplink, UL and downlink, DL, transmissions. The configuration of aggregated CCs is referred to as "symmetric" when the number of CCs in the UL is the same as in the DL. Thus, a CA configuration with different numbers of CCs aggregated in the UL versus the DL is referred to as an asymmetric configuration. Also, the number of CCs configured for a geographic cell area may be different from the number of CCs seen by a given mobile terminal. A mobile terminal, for example, may support more downlink CCs than uplink CCs, even though the same number of uplink and downlink CCs may be offered by the network in a particular area.

LTE systems can operate in either Frequency-Division Duplex, FDD, mode or in TDD mode. In FDD mode, downlink and uplink transmissions take place in different, sufficiently separated, frequency bands. In TDD mode, on the other hand, downlink and uplink transmission take place in different, non-overlapping time slots. Thus, TDD can operate in unpaired spectrum, whereas FDD requires paired spectrum. TDD mode also allows for different asymmetries in terms of the amount of resources allocated for uplink and downlink transmission, respectively. In this regard, the UL/DL configuration of a TDD cell determines, among other things, the particular allocation of subframes for DL use and for UL use, within a given radio frame. Different UL/DL configurations correspond to different proportions of DL and UL allocations. Accordingly, UL and DL resources can be allocated asymmetrically for a given TDD carrier.

One consideration for operation in the CA context is how to transmit control signaling on the UL from a User Equipment, UE, or other mobile terminal to the wireless network. Among other things, UL control signaling includes HARQ feedback. As used herein, the term "HARQ feedback" denotes the HARQ-ACK bits transmitted from the mobile terminal for CCs being reported on, for a given HARQ feedback window. In CA, for a given HARQ feedback transmission at UL subframe n, each CC (serving cell) will have some number of DL subframes that are associated with the HARQ feedback, which are referred to as the association set for the serving cell. The UL/DL configurations of the serving cells in the CA configuration define these association sets—and the reader may refer to Table 10.1.3.1-1 in 3GPP TS 36.213 version 10.5.0 Release 10, for an example of association set details.

Thus, for HARQ reporting in the CA context, each serving cell in the CA configuration has certain associated DL subframes within a defined window of subframes, and in this disclosure, the term "HARQ feedback window" unless noted otherwise, refers to the overall set or span of DL subframes that is associated with the HARQ feedback being generated, as taken across all serving cells involved in the HARQ feedback generation. That is, unless otherwise noted, the term "HARQ feedback window" spans all of the association sets of the respective serving cells being reported on in a given HARQ feedback event. Further, the term "HARQ-ACK bit" as used herein refers to a given HARQ feedback bit or bit position within the HARQ feedback, regardless of whether the state of that bit is an ACK value, a NACK value, or a DTX value.

A UE operating in accordance with LTE Rel-8 or Rel-9—i.e., without CA—is configured with only a single downlink CC and uplink CC. The time-frequency resource location of the first Control Channel Element, CCE, used to transmit the Physical Downlink Control Channel, PDCCH, for a particular downlink assignment determines the dynamic resource to be used by the targeted UE for sending corresponding HARQ feedback on a PUCCH, which in this context is referred to as a "Rel-8 PUCCH". No PUCCH collisions occur in the Rel-8 scheme, because all PDCCHs for a given subframe are transmitted by the network using a different first CCE. Therefore, each targeted UE sends HARQ feedback corresponding to its PDCCH reception using different CCE resources in the UL.

HARQ feedback becomes more complicated in the CA context, where the HARQ feedback relates to multiple serving cells or, equivalently, multiple CCs. For CA in the DL, the UE must feed back multiple HARQ bits for the case of simultaneous transmission on multiple CCs. PUCCH format 3 provides an efficient mechanism for feeding back more than four HARQ-ACK bits in a given UL subframe and thus represents a good choice for HARQ feedback in CA configurations involving more than two serving cells.

In more detail, PUCCH format 3 uses DFT-precoded OFDM, which is also used by the UE for UL Shared Channel, UL-SCH, transmissions. In Rel-10 CA PUCCH, one or two HARQ-ACK bits are generated per DL CC, depending on the transmission mode of each CC. These bits and a Scheduling Request, SR, bit, if present, are concatenated into a sequence of bits, with bits corresponding to unscheduled Transport Blocks set to zero. Block coding and scrambling as applied to this sequence produces 48 bits, which are QPSK-modulated, split into two groups of 12 QPSK symbols each, and the two groups are transmitted by the UE in the two slots of the subframe n in which the HARQ feedback is transmitted.

However, CA PUCCH and other HARQ feedback protocols in Rel-10 are predicated on the assumption that all serving cells in a given CA configuration have the same UL/DL configurations and thus have the same UL/DL subframe allocations. This assumption is seen, for example, in use of the "M" parameter as explained in Section 10.1.3.1 and Table 10.1.3.1-1 in the aforementioned 3GPP TS 36.213. The "M" parameter of a serving cell or CC in a CA configuration can be understood as representing the size of the association set of the serving cell with respect to the HARQ feedback to be generated.

Rel-11, among other things, adds the flexibility of aggregating carriers having different UL/DL configurations and aggregating carriers having different frequency bands and/or Radio Access Technologies, RATs. Rel-11 thus introduces a number of new HARQ feedback scenarios that are incompatible with the HARQ feedback signaling introduced in Rel-10 for CA scenarios.

SUMMARY

In one aspect, the teachings herein provide a system and method for reusing the PUCCH format 3 to address the new HARQ-ACK feedback cases encountered in Rel-11, where different UL/DL configurations are involved in the CA configuration of a UE, such as Rel-11 interband TDD CA with different UL/DL configurations on different bands. The various embodiments illustrated by way of example in this disclosure enable reliable and efficient HARQ-ACK feedback for Rel-11 TDD CA without a substantial increase in specification and implementation complexity.

An example embodiment relates to a method at a UE for generating HARQ feedback for transmission in a wireless communication network, e.g., an LTE network. The method includes receiving a Downlink Assignment Index, DAI, in an UL grant for the UE, where the UE is operating according to a CA configuration that aggregates a number of TDD cells of a wireless communication network as serving cells for the UE. In this context, the value of the DAI indicates to the UE the number of subframes for which the UE shall potentially provide HARQ feedback and thus is not a cell-specific value, in contrast to the cell-specific association set sizes of the serving cells. The DAI indicated in the UL grant is single value that is valid across multiple serving cells.

The method further includes determining the number of HARQ feedback bits to generate for each serving cell based on the minimum one between the value of the DAI and the size of an association set for the serving cell. The association set of each serving cell is defined by the UL/DL configurations of the serving cells and indicates which DL subframes are associated with the HARQ feedback for the serving cell. Correspondingly, the method includes generating the HARQ feedback based on generating the determined number of HARQ feedback bits for each of the serving cells. The method enables the UE to reuse PUCCH format 3 for HARQ feedback transmission on PUSCH, even for Rel-11 CA configurations involving serving cells of differing UL/DL configurations.

In another embodiment, a UE is configured to generate HARQ feedback for transmission in a wireless communication network. According to this example configuration, the UE includes a communications interface and a controller circuit that is operatively associated with the communications interface. The communications interface is configured for communicating with the wireless communication network via an air interface and the controller circuit operates according to an advantageous configuration for generating HARQ feedback.

In one such example, the controller circuit is configured to receive a DAI in a UL grant for the UE, where the UE is operating according to a CA configuration that aggregates a number of TDD cells of the wireless communication network as serving cells for the UE. As noted, the value of the DAI indicates to the UE the number of DL scheduling assignments associated with the HARQ feedback and thus is not a cell-specific value, in contrast to the cell-specific association set sizes of the serving cells.

The controller is further configured to determine the number of HARQ feedback bits to generate for each serving cell based on the minimum one between the value of the DAI and the size of an association set for the serving cell, where the association set of each serving cell is defined by the UL/DL configurations of the serving cells and indicates which DL subframes are associated with the HARQ feedback for the serving cell. Correspondingly, the controller circuit is configured to generate the HARQ feedback based on generating the determined number of HARQ feedback bits for each of the serving cells.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

FIG. 8 illustrates Table 2, which is used in Rel-11 CA to determine HARQ timing for a Secondary Cell, SCell, in the CA configuration of the UE based on the UL/DL configurations of the SCell and the Primary Cell, PCell, in the CA configuration.

DETAILED DESCRIPTION

Figure 1:
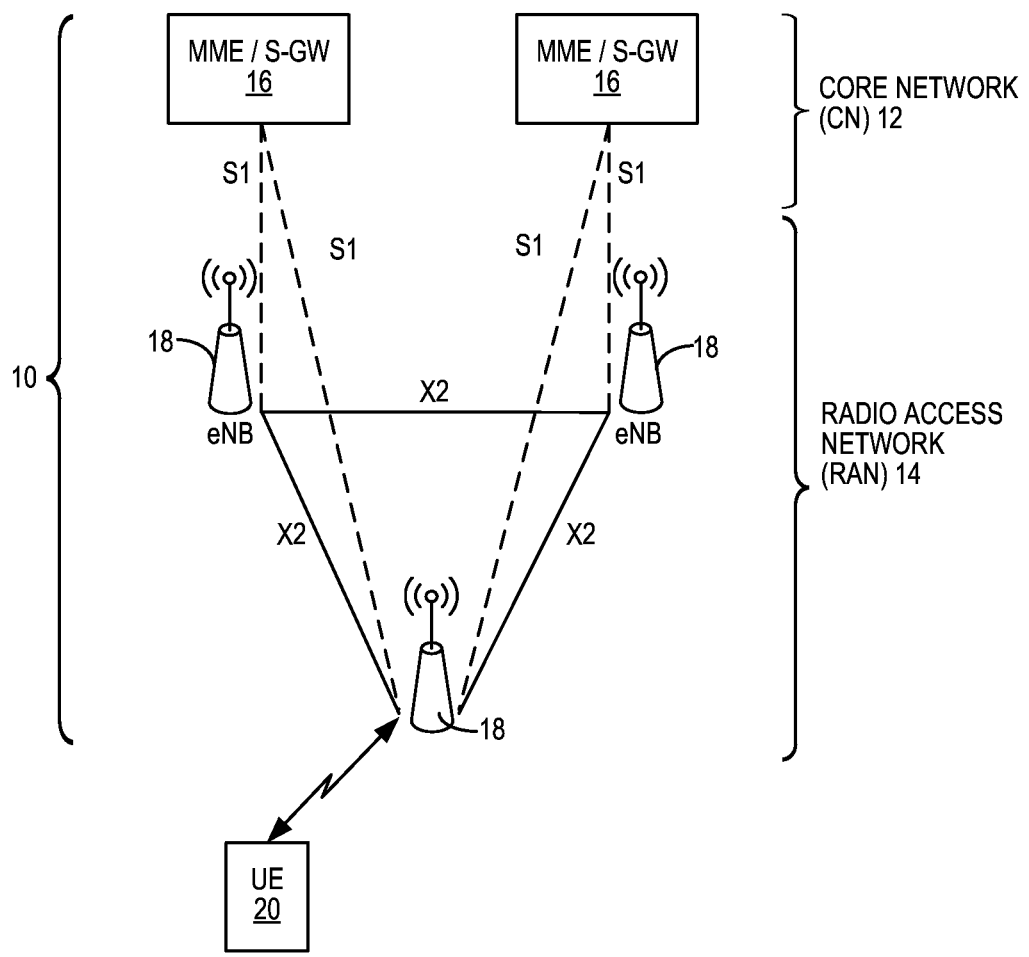
FIG. 1 is a functional block diagram illustrating a Long Term Evolution, LTE, network that is configured according to the teachings herein.

FIG. 1 illustrates a representative example of a modern wireless communication network 10 contemplated for use in one or more embodiments of the teachings presented herein. In particular, the network 10 is depicted according to the LTE standards promulgated by 3GPP. As shown, the network 10 includes a core network 12—an "evolved packet core" in the LTE context—and radio access network 14—which is denoted as an E-UTRAN for the LTE context—i.e., an Evolved Universal Terrestrial Radio Access Network.

The core network 12 comprises a plurality of nodes 16 including those having the functionality of a Mobile Management Entity, MME, and a Signaling Gateway, S-GW. In turn, the radio access network 14 includes a number of base stations 18, referred to as evolved NodeBs, eNodeBs, or simply eNBs in the LTE context. The eNBs 18 communicatively connect to each other over a logical interface referred to as the "X2" interface. Further, the eNBs 18 communicate with the MME/S-GWs 16 over a logical interface referred to as the "S1" interface.

The eNBs 18 also communicate with one or more user terminals, as represented by the User Equipment, UE, 20 shown in the diagram. With respect to those communications, each eNB 18 provides or otherwise controls one or more "cells". Multiple cells associated with one eNB 18 may partly or wholly overlap in terms of geographic area. Likewise, cells associated with neighboring eNBs 18 may at least partly overlap at their respective borders. As is well understood in the art, a cell may be understood as the allocation of particular radio resources over a particular geographic area. For example, a given eNB 18 may provide two cells that partially or wholly overlap by using different carriers for the two cells, e.g., carriers in different frequency bands or subbands. Unless the distinction is needed for clarity, the term "serving cell" is used interchangeably with "component carrier" or "CC", in the CA context of interest herein.

For further ease of discussion FIG. 1 illustrates only one UE 20. Of course, there may be many UEs 20 supported by the network 10 and, similarly, the network 10 may include additional eNBs 18, MME/S-GWs 16, and various other entities not shown, such as for authorization, access control and accounting, operations and maintenance, etc. As an additional point of understanding, the term "UE" should be given a broad construction that encompasses essentially any wireless device or apparatus that is configured to operate within the network 10, with mobile terminals such as cellular telephones or other wireless computing devices being non-limiting examples.

The radio access network 14 provides an air interface communicatively linking the UEs 20 and the eNBs 18, where the air interface is defined by specific frequencies, signal type/structure, timing, protocols, etc. In the example case, the air interface follows the LTE specifications. The eNBs 18 provide the UEs 20 with access to the core network 12, and to other systems and networks to which the core network 12 is communicatively coupled.

Figure 2:
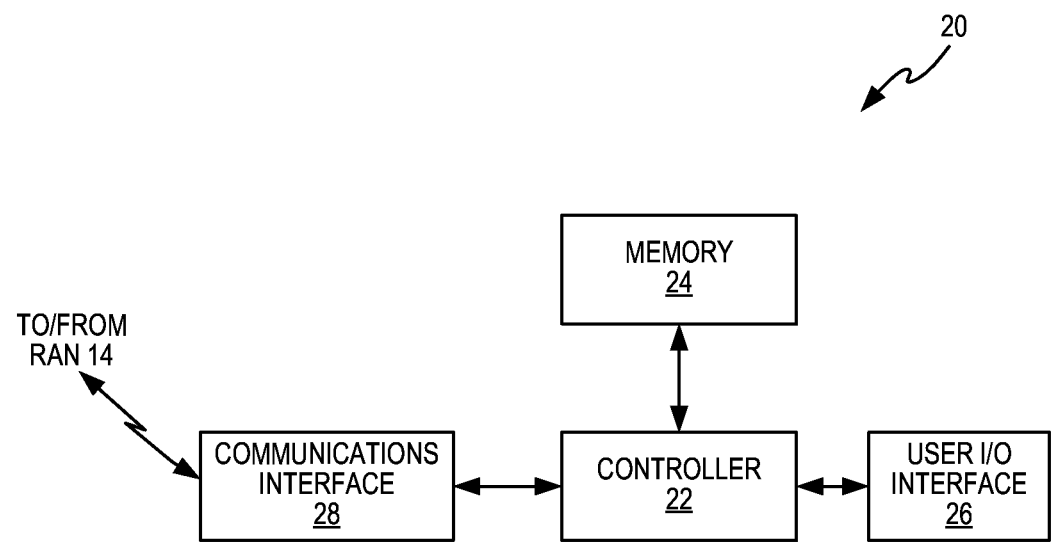
FIG. 2 is a functional block diagram illustrating example components of a User Equipment, UE, that is configured according to the teachings herein.

FIG. 2 provides a functional block diagram illustrating components of an example UE 20 configured to operate according to one or more embodiments of the teachings herein. As seen in the diagram, the example UE 20 comprises a programmable controller 22, a memory 24, a user I/O interface 26, and a communications interface 28. The user I/O interface 26 provides the components necessary for a user to interact with the UE 20 and its details depend on the intended use and features of the UE 20, which are of no particular concern in this discussion.

The communications interface 28 comprises a transceiver—a transmitter and receiver—that supports wireless communication with the wireless communication network 10 via an air interface. That is, the communications interface 28 provides for communications with the eNBs 18 in the network 10 over the appropriate air interface. In one or more embodiments, the air interface is an LTE-based air interface and the communications interface 28 is configured to operate according to the LTE specifications, e.g., according to Rel-11. The memory 24 may comprise any solid-state memory or computer readable media known in the art. Suitable examples of such media include, but are not limited to, ROM, DRAM, FLASH, or a device operable as computer-readable media, such as optical or magnetic media. Of course, working memory such as SRAM also may be included, e.g., in or accessible to the programmable controller 22.

The programmable controller 22, also referred to as a "controller circuit", is implemented by one or more microprocessors, hardware, firmware, or any combination thereof, and generally controls the operation and functions of the UE 20 according to the appropriate standards. Such operations and functions include, but are not limited to, communicating with the eNBs 18 as previously noted. In this regard, the programmable controller 22 may be configured to implement logic and instructions stored in memory 24 to perform the device-side method(s) described herein, or any variations or extensions. In particular, it will be understood that whether configured programmatically via computer program instruction execution or configured via fixed circuitry, the example UE 20 is configured to generate HARQ feedback according to the teachings herein.

According to one example, the UE 20 is configured to generate HARQ feedback for transmission in the network 10 in a manner that allows the UE 20 to reuse the PUCCH Format 3, as used in Rel-10 for CA PUCCH, to address the new HARQ-ACK feedback cases encountered in Rel-11, such as interband TDD CA with different UL/DL configurations on different bands. The embodiment represented by this example, and other embodiments disclosed herein, enable reliable and efficient HARQ-ACK feedback for the new HARQ feedback scenarios in Rel-11 that involve CA configurations of serving cells having different UL/DL configurations, such as Rel-11 interband TDD CA without a substantial increase in specification and implementation complexity.

Figure 3:
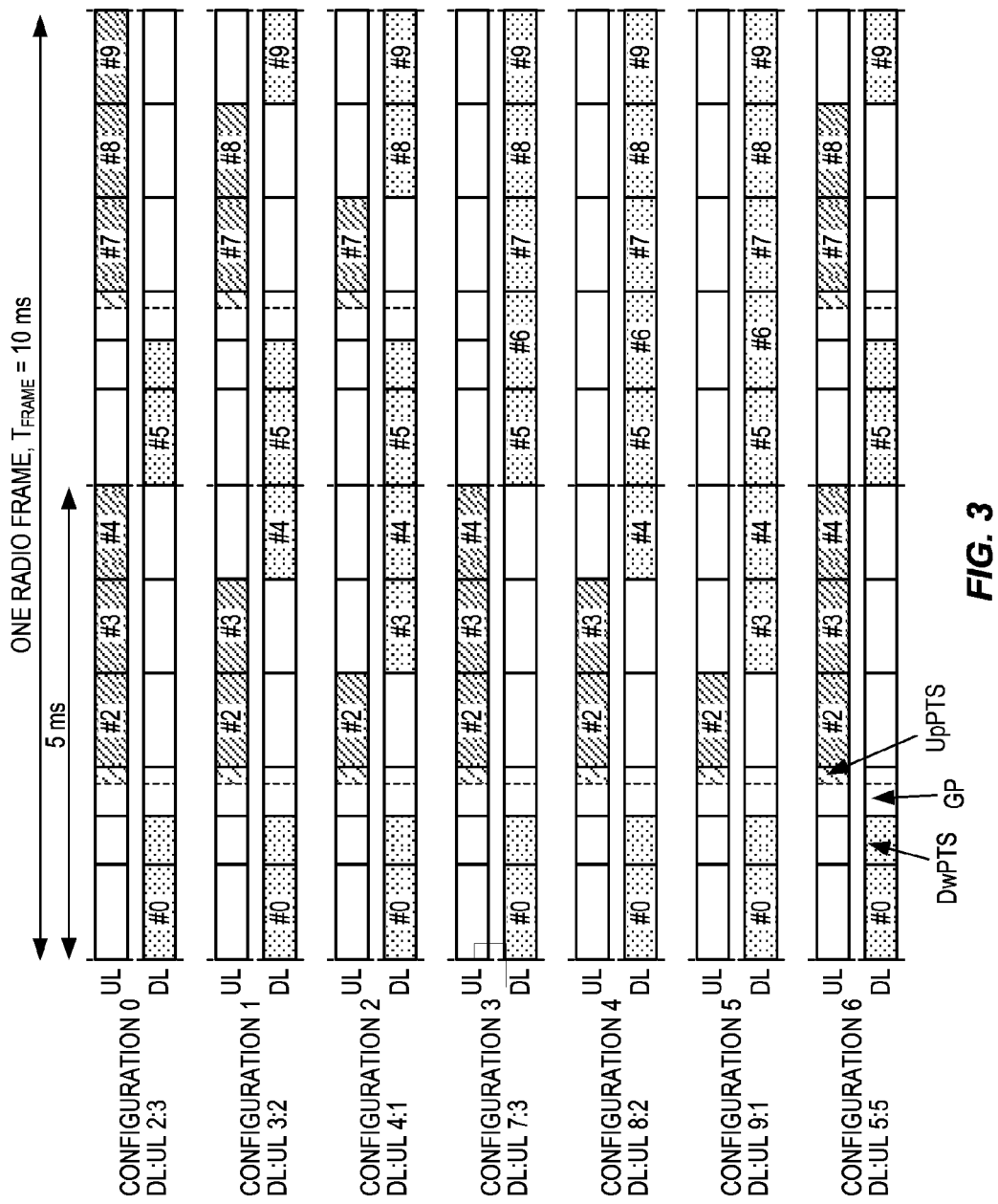
FIG. 3 is a diagram illustrating example UL/DL configurations for TDD operation of cells in the network of FIG. 1, for example.

To better understand these advantages, consider FIG. 3, which depicts seven defined UL/DL configurations for TDD operation of a cell in an LTE network. The LTE radio frame is ten milliseconds and each frame includes ten subframes of one millisecond each. Those skilled in the art will appreciate that each LTE subframe includes two slots of one-half millisecond each, and that each slot spans six or seven Orthogonal Frequency Division Multiplexing, OFDM, symbol times, depending on whether normal Cyclic Prefix, CP, or extended CP is being used. From the diagram, one sees that each UL/DL configuration defines a certain allocation of subframes to DL use and to UL use, and includes "special" subframes having an abbreviated DL part—DwPTS—and an abbreviated UL part—UpPTS. A guard portion or GP separates the DL and UL parts of a special subframe.

Figures 4, 5:
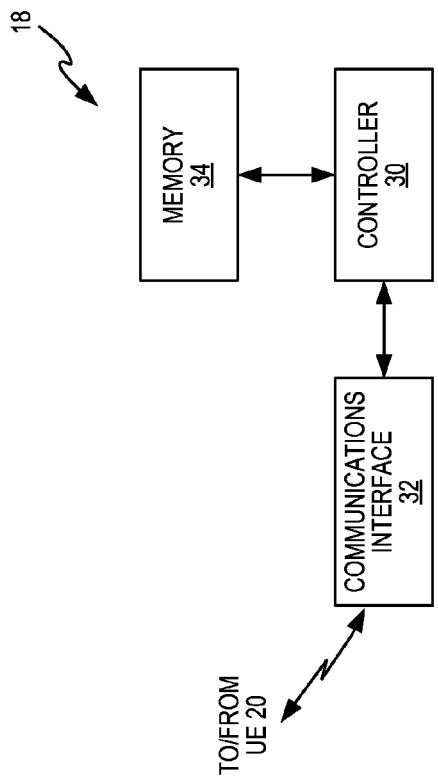
FIG. 4 illustrates Table 1, which is a reproduction of Table 10.1.3.1-1 from 3GPP TS 36.213, and which defines association sets for TDD cells operating according to the UL/DL configurations shown in FIG. 3.
FIG. 5 is a functional block diagram illustrating an eNodeB or eNB that is configured according to the teachings herein.

LTE Rel-8 specifies that a UE shall provide HARQ feedback for PDSCH decoding in an UL subframe having a predefined position relative to the DL subframes for which the HARQ feedback is being generated. In particular, the UE shall transmit such HARQ feedback on the PUCCH in UL subframe n if there is a PDSCH transmission indicated by the detection of a corresponding Physical Downlink Control Channel, PDCCH, or there is a PDCCH indicating downlink Semi-Persistent Scheduling, SPS, release within subframe(s) n−k, where k is within a so-called association set $K=\{k_0, k_1, \ldots, k_{M-1}\}$. As introduced earlier in this disclosure, the association set can be understood as defining the DL subframes that are associated with the HARQ feedback being generated for transmission at UL subframe n. Table 1 as shown in FIG. 5 illustrates the association sets as specified in TS 36.213 for the different UL/DL configurations shown in FIG. 5 and is a reproduction of Table 10.1.3.1-1 in 3GPP TS 36.213.

The size of the association set K is denoted by M. In Rel-10, the parameter M is used to determine the PUCCH resources and signaling for HARQ feedback. The parameter M may take on different values in different subframes and in cells of different UL/DL configurations. However, as noted, for the CA context, Rel-10 assumes that all aggregated serving cells have the same UL/DL configuration. As a consequence, for any given subframe, the M parameters are identical across all CCs configured as serving cells for a UE in Rel-10 CA.

Figure 6:
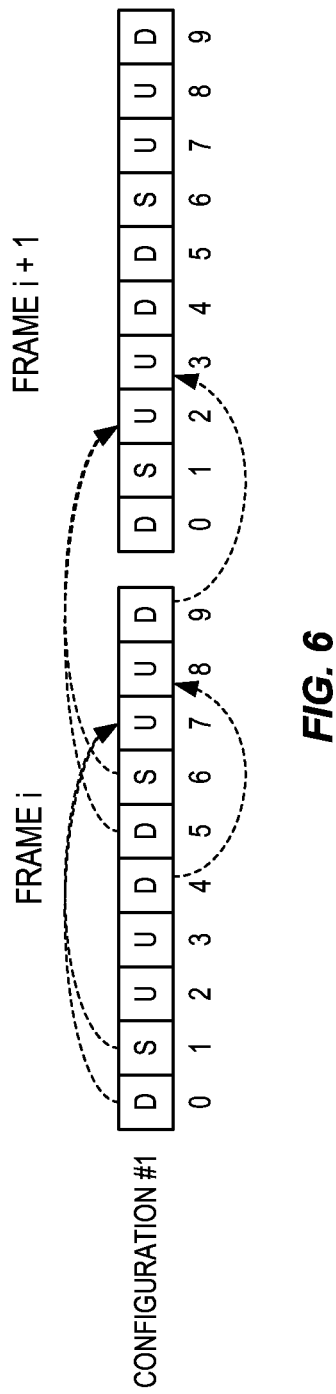
FIGS. 6 and 7 illustrate DL subframe associations for a given HARQ feedback event, according to the association set definitions given in Table 1, for UL/DL configurations #1 and #2.

To better understand the DL subframe association sets, consider that Table 1 illustrates K={7,6} for UL subframe 7 according to UL/DL Configuration #1. That corresponds to carrying possible HARQ feedback bits for PDSCHs transmitted to the UE in subframes 7−7=0 and 7−6=1. This arrangement is illustrated in FIG. 6, which shows two consecutive LTE frames of ten subframes each, where the subframes in each frame are indexed from 0 to 9. One sees for UL/DL Configuration #1 arrows pointing from DL subframes 0 and 1 to the UL subframe 7, indicating that the HARQ feedback sent in UL subframe 7 will be for DL subframes 0 and 1. For UL subframe 7 in FIG. 6, then, the HARQ feedback window spans the two DL subframes 0 and 1 that are associated with UL subframe 7 according to the association set defined for it. It will be understood that M=2 in this case, i.e., that the association set size is two for UL subframe 7 in the first illustrated frame, denoted as "FRAME i" in the diagram. Also note that in the diagram, "D" indicates DL subframes, U indicates UL subframes, and S indicates special subframes.

Figure 7:
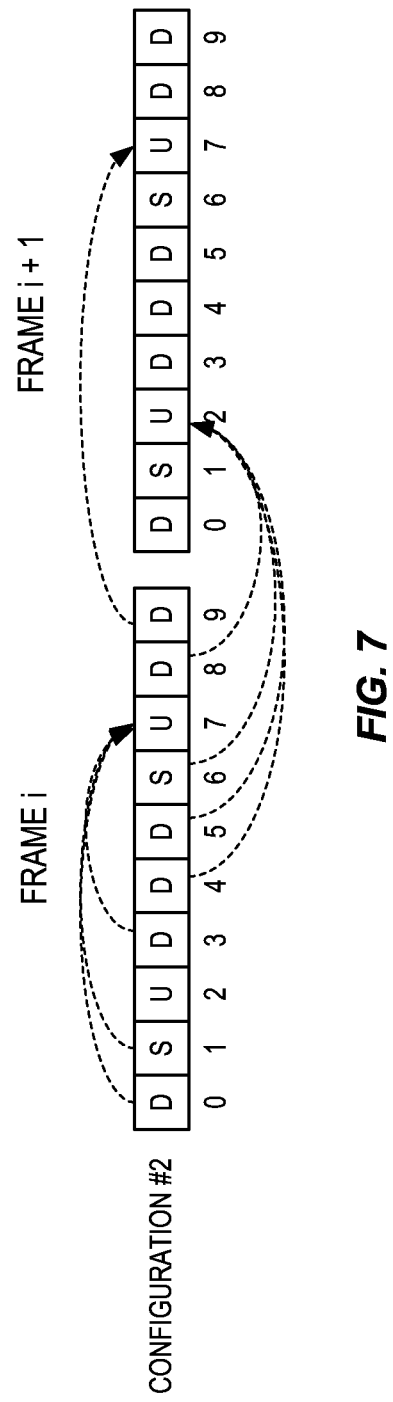

In a similar example, FIG. 7 illustrates that, according to Configuration #2, the UL subframe 2 in the second frame, FRAME i+1, has an association set defined by K={8, 7, 4, 6}, which corresponds to carrying possible HARQ feedback for PDSCHs transmitted in subframes 4, 5, 6, and 8 of the preceding frame, FRAME i. This arrangement is illustrated as arrows from the associated DL subframes to the UL subframe 2. Correspondingly, it will be understood that M=4 for the UL subframe 2 in FRAME i+1, i.e., its association set size equals four and the corresponding HARQ feedback window includes all of the associated DL subframes.

Similar timing relationships are extended for CA operation in Rel-10 and Rel-11. In Rel-11, for the case of aggregating a Primary Cell, PCell, and a Secondary Cell, SCell, the SCell PDSCH HARQ timing is determined based on the SCell PDSCH HARQ timing reference configuration number given in Table 2, as shown in FIG. 8. As will be understood, the term "SIB" in the table refers to "System Information Block".

The SCell PDSCH HARQ timing references given in Table 2 are used when the SCell is scheduled with PDCCH transmitted on the SCell—i.e., a self-scheduling cell. Similar types of SCell PDSCH HARQ timing reference configuration numbers can also be defined in case of cross-scheduled SCell. The teachings presented herein are applicable to such cases. Where the CA configuration of a UE includes three or more serving cells, the SCell PDSCH HARQ timing of each of the serving SCell is determined separately based on the PCell and the concerned SCell UL/DL configurations according to Table 2.

With the above context in mind, one or more embodiments of the present invention provide for the advantageous reuse of PUCCH format 3 in Rel-11 CA configuration scenarios involving CCs having different values of M parameters. Such reuse is performed in a manner that is essentially transparent with respect to the CA-PUCCH protocols established for CA PUCCH in Rel-10, or are at least minimally disruptive with respect to those standards, and similarly impose minimal additional complexity on the UE.

In one embodiment, the UE 20, such as shown in the example configuration of FIG. 2, is configured to generate HARQ feedback for transmission in the network 10. The communications interface 28 comprises a transceiver for communicating with the network 10 via an air interface; and the controller circuit 22 is operatively associated with the communications interface 28 and configured to receive a DAI in an UL grant for the UE 20, where the UE 20 is operating according to CA configuration that aggregates a number of TDD cells of the wireless communication network 10 as serving cells for the UE 20. One may assume that the CA configuration is a Rel-11 CA configuration where not all of the serving cells have the same UL/DL configuration. Also, as noted, the value of the DAI indicates the number of DL scheduling assignments associated with the HARQ feedback and it should be reiterated that the DAI is not a cell-specific value.

Continuing with the example configuration details for this embodiment, the controller circuit 22 is further configured to determine the number of HARQ feedback bits to generate for each serving cell based on the minimum one between the value of the DAI and the size of an association set for the serving cell. As noted elsewhere herein, the association set of each serving cell is defined by the UL/DL configurations of the serving cells and indicates which DL subframes are associated with the HARQ feedback for the serving cell. The controller circuit 22 is further configured to generate the HARQ feedback based on generating the determined number of HARQ feedback bits for each of the serving cells.

In one example, determining the number of HARQ feedback bits to generate for each serving cell, the controller circuit 22 is configured to set, for each serving cell, the number equal to the minimum one between the value of the DAI and the size of the association set defined for the serving cell. In another example embodiment, or in the same embodiment but under different conditions, the controller circuit 22 is configured to determine the number of HARQ feedback bits to generate for each serving cell by, for each serving cell, setting the number equal to a multiple of the minimum one between the value of the DAI and the size of the association set defined for the serving cell, and setting the multiple as a function of a transport block transmission mode of the UE 20 for the serving cell. The UE 20 in an example configuration sets the multiple to one if the UE 20 is configured with a single transport block transmission mode for the serving cell, and setting the multiple to two if the UE 20 is configured with a two transport block transmission mode for the serving cell.

In the same or another embodiment, the controller circuit 22 is configured to perform the above-described determine and generate operations for HARQ feedback generation conditionally, in dependence on subframe configuration values, so that HARQ feedback bits are not generated for any DL subframes having one or more defined special subframe configurations.

In the same or other embodiments, the controller circuit 22 is configured to transmit the HARQ feedback on a PUSCH corresponding to the UL grant. In one example of such a transmission, the controller circuit 22 reuses PUCCH format 3, to report HARQ feedback for a Rel-11 CA configuration involving different UL/DL configurations of the included serving cells.

In a related embodiment, a computer program comprises instructions stored in the memory 24 or other computer readable medium, which, when executed by the controller circuit 22, configure the UE 20 to generate HARQ feedback for transmission in the network 10, based on configuring the UE 20 to: (a) receive a DAI in an UL grant for the UE 20, for a case where the UE 20 is operating according to a CA configuration that aggregates a number of TDD cells of the network 10 as serving cells for the UE 20; (b) determine the number of HARQ feedback bits to generate for each serving cell based on the minimum one between the value of the DAI and the size of an association set for the serving cell, where the association set of each serving cell is defined by the UL/DL configurations of the serving cells and indicates which DL subframes are associated with the HARQ feedback for the serving cell; and (c) generate the HARQ feedback based on generating the determined number of HARQ feedback bits for each of the serving cells.

In the context of the illustrated example network 10, a given eNB 18 receives HARQ feedback from a given UE 20, as advantageously generated according to the above example(s). Correspondingly, FIG. 5 illustrates a functional block diagram of an example eNB 18 that is configured to carry out network-side processing according to one or more embodiments taught herein. The example eNB 18 comprises a programmable controller 30, a communications interface 32, and a memory 34. The communications interface 32 may, for example, comprise a transmitter and receiver configured to operate in an LTE system or other similar system. As is known in the art, the transmitter and receiver are coupled to one or more antennas, which are not shown, and communicate with the UE 20 over the LTE-based air interface. Memory 34 may comprise any solid-state memory or computer readable media known in the art. Suitable examples of such media include, but are not limited to, ROM, DRAM, Flash, or a device capable of reading computer-readable media, such as optical or magnetic media.

The programmable controller 30 controls the operation of the eNB 18 in accordance with the LTE standard. The functions of the controller 30 may be implemented by one or more microprocessors, hardware, firmware, or a combination thereof, and include performing the network-side processing described herein. Thus, the controller 30 may be configured, according to logic and instructions stored in memory 34, to communicate with UEs 20, and to perform the network-side aspects of HARQ-feedback related processing as taught herein. In an example configuration according to those teachings, the eNB 18 only tries to receive the amount of HARQ-ACK bits that the UE 20 would in total generate according to the device-side teachings herein. This configuration at the eNB 18 thus saves resources on PUSCH when the HARQ feedback is multiplexed with either data or CSI and thus allows a higher code rate on the data on PUSCH.

Turning back to device-side aspects of the teachings herein, the advantageous configuration of the controller circuit 22, as illustrated by way of the above examples, allows, among other things, PUCCH format 3 to be used for Rel-11 CA PUCCH involving serving cells of differing M parameters. In an example embodiment, the controller circuit 22 is configured: to determine the number of HARQ feedback bits to generate for each serving cell based on the minimum one between the value of the DAI and the size of the association set for the serving cell; and generate the HARQ feedback based on generating the determined number of HARQ feedback bits for each of the serving cells.

In an example embodiment of the above-detailed generation rule, the controller circuit 22 is configured to determine the number of HARQ feedback bits to generate for each serving cell by, for each serving cell, setting the number equal to the minimum one between the value of the DAI and the size of the association set defined for the serving cell. Thus, in this embodiment, determining the number of HARQ bits to generate for each serving cell c based on the minimum one between the DAI value and the size of the association set for serving cell c means determining the number as the minimum one between the DAI and association set size for serving cell c. If the value of the DAI as received in the UL grant to the UE 20 is represented as $W_{DAI}^{UL}$ and if the size of the association set for serving cell c is represented as $M_c$, then this embodiment of the HARQ feedback generation rule can be represented as # of HARQ ACK bits for serving cell $c = \min(W_{DAI}^{UL}, M_c)$.
By way of example for a given HARQ feedback event and a given serving cell c involved in that event, assume $W_{DAI}=2$ and $M_c=1$. Here, the above generation rule would be based on the $M_c$ parameter because it has the minimum value. Conversely, assume that $W_{DAI}^{UL}=1$ and $M_c=2$. Here, the above generation rule would be based on the $W_{DAI}^{UL}$ parameter because it has the minimum value. For more comprehensive details regarding $W_{DAI}^{UL}$ and other aspects of DAI in the context of Rel-11, the reader may refer to Section 7.3 in 3GPP TS 36.213 version 11.1.0 Release 11.

In another example, the controller circuit 22 is configured to determine the number of HARQ feedback bits to generate for each serving cell c by, for each serving cell c, setting the number equal to a multiple of the minimum one between the value of the DAI and the size of the association set defined for the serving cell. In this example, the controller circuit 22 sets the multiple as a function of a number of transport blocks that are possible for the configured DL transmission mode for the UE 20, for the serving cell. In one example of this approach, the UE 20 sets the multiple to one if the UE 20 is configured with a single transport block for the DL transmission mode for the serving cell, and sets the multiple to two if the UE 20 is configured with two transport blocks for the DL transmission mode for the serving cell.

In at least some embodiments of the above processing, the controller circuit 22 is configured to determine and generate operations conditionally in dependence on subframe configuration values, so that HARQ feedback bits are not generated for any DL subframes having one or more defined special subframe configurations. Refer back to FIG. 3 for an example of UL/DL configuration definitions and special subframe configuration examples.

For example, the controller circuit 22 is configured to transmit the HARQ feedback, as generated according to the above generation rule, on a PUSCH, according to the UL grant received by the UE 20. That is, in at least one example, a UE 20 uses the above HARQ feedback generation rule to send HARQ feedback for a Rel-11 CA configuration, reusing Rel-10 CA PUCCH format 3. Here, the controller circuit 22 received the DAI in the corresponding UL grant.

Figure 9:
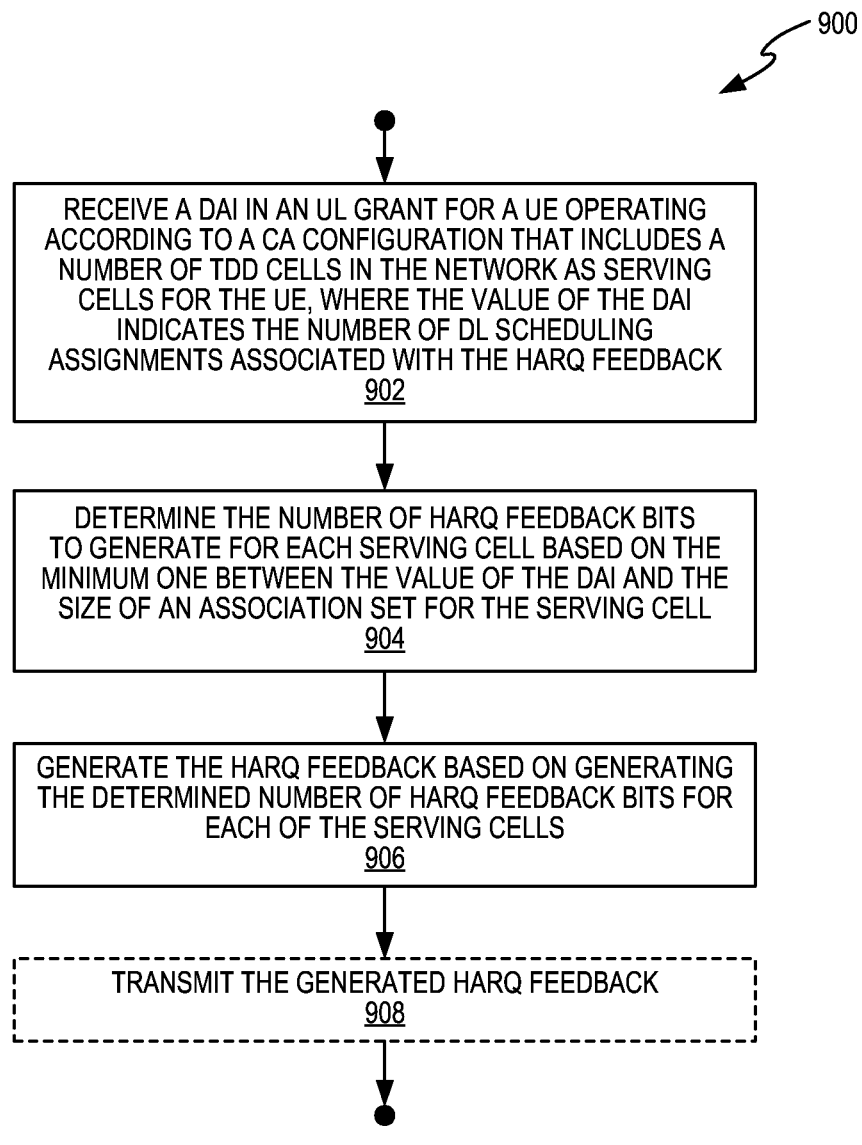
FIG. 9 is a logic flow diagram of one embodiment of a method of HARQ feedback generation, as taught herein for a UE.

In another example embodiment of the teachings presented herein, FIG. 9 illustrates a method 900 for generating HARQ feedback for transmission in the network 10. The method 900 may be implemented at the UE 20, for example, via configuration of the controller circuit 22. According to the illustrated example, the method 900 includes: receiving (Block 902) a DAI in an UL grant for the UE 20, where the UE 20 is operating according to a CA configuration that aggregates a number of TDD cells of the wireless communication network 10 as serving cells for the UE 20; determining (Block 904) the number of HARQ feedback bits to generate for each serving cell based on the minimum one between the value of the DAI and the size of an association set for the serving cell, where the association set of each serving cell is defined by the UL/DL configurations of the serving cells and indicates which DL subframes are associated with the HARQ feedback for the serving cell; and generating (Block 906) the HARQ feedback based on generating the determined number of HARQ feedback bits for each of the serving cells and transmitting (Block 908) the generated HARQ-ACK bits, e.g., using PUCCH format 3.

Figure 10:
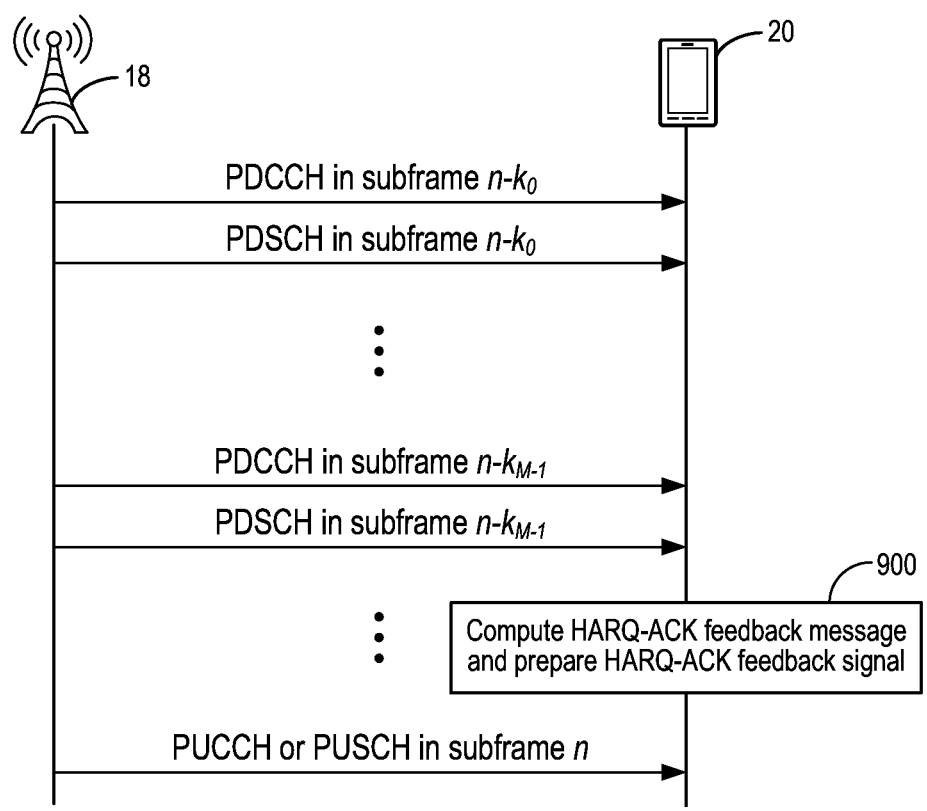
FIG. 10 is a signaling diagram illustrating a HARQ feedback signaling procedure according to one or more embodiments of HARQ feedback generation taught herein.

Correspondingly, FIG. 10 is a signal flow diagram illustrating example signaling between the UE 20 and an eNB 18 in the network 10. FIG. 10 thus can be understood as presenting an example context relevant to the method 900.

Consider an example scenario of operation for a UE 20 configured according to one embodiment herein. For this example, one may assume that the UE 20 is operating with a Rel-11 CA configuration in which one or more of the DL serving cells for which the HARQ feedback is being generated have different value M parameters. Further, assume that UE 20 will transmit the HARQ feedback on a PUSCH corresponding to an UL grant to the UE 20, assume that UL/DL configuration 0 is not in use for any of the serving cells being reported on, and assume that the UE 20 applies spatial HARQ-ACK bundling across multiple codewords within a DL subframe for a given cell, based on performing a logical AND operation of all the corresponding individual HARQ-ACK bits for the DL subframe. Here, the UE 20 generates $\min(W_{DAI}^{UL}, M_c)$ HARQ-ACK bits per serving cell in the CA configuration, where, $M_c$ denotes the M parameter for the c-th serving cell and $W_{DAI}^{UL}$ is received by the UE 20 in the UL grant.

Consider another example scenario, but one where the UE 20 does not apply spatial HARQ-ACK bundling across multiple codewords within a DL subframe. Here, for each DL serving cell that is configured with a DL transmission mode that supports a single transport block for the UE 20, the UE 20 generates $\min(W_{DAI}^{UL}, M_c)$ HARQ-ACK bits. For each DL serving cell of the UE 20 that is configured with a DL transmission mode that supports two transport blocks for the UE 20, the UE 20 generates $2 \cdot \min(W_{DAI}^{UL}, M_c)$ HARQ-ACK bits.

For the scenarios above, the UE 20 may be further configured to exclude from the generated HARQ-ACK bits those bits corresponding to a special subframe of configuration 0 and 5 for normal cyclic prefix, and 0 and 4 for extended cyclic prefix. If the UE 20 generates more than $M_c$ number of HARQ-ACK bits for the c-th DL serving cell—in a case where the UE 20 is not configured to follow the $\min(W_{DAI}^{UL}, M_c)$ rule—the additional HARQ-ACK bits generated can be set to either NACK or Discontinuous Transmission, DTX.

In another example, the UE 20 may be configured to generate $M_c$ HARQ-ACK bits per serving cell c, for a PUCCH format 3 transmission or PUSCH transmission that is not based on an UL grant. For a PUSCH transmission that is based on an UL grant, the UE 20 generates $\min(W_{DAI}^{UL}, M_c)$ HARQ-ACK bits per DL serving cell for which the HARQ feedback is being generated. Again, $W_{DAI}^{UL}$ is a value indicating the number of scheduled DL subframes for the UE 20 within the total HARQ-ACK feedback window across all serving cells.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a User Equipment (UE) of generating Hybrid Automatic Repeat reQuest (HARQ) feedback for transmission in a wireless communication network, said method comprising:
   receiving a Downlink Assignment Index (DAI) in an Uplink (UL) grant for the UE, where the UE is operating according to a Carrier Aggregation (CA) configuration that aggregates a number of Time Division Duplex (TDD) cells of the wireless communication network as serving cells for the UE;
   determining the number of HARQ feedback bits to generate for each serving cell based on a minimum one between the value of the DAI and the size of an association set for the serving cell, where the association set of each serving cell is defined by the Uplink/Downlink (UL/DL) configurations of the serving cells and indicates which DL subframes are associated with the HARQ feedback for the serving cell; and
   generating the HARQ feedback based on generating the determined number of HARQ feedback bits for each of the serving cells;
   wherein said steps of determining and generating are performed conditionally in dependence on subframe configuration values, so that HARQ feedback bits are not generated for any DL subframes having one or more defined special subframe configurations.

2. The method of claim 1, wherein determining the number of HARQ feedback bits to generate for each serving cell comprises, for each serving cell, setting the number equal to the minimum one between the value of the DAI and the size of the association set defined for the serving cell.

3. The method of claim 1, wherein determining the number of HARQ feedback bits to generate for each serving cell comprises, for each serving cell, setting the number equal to a multiple of the minimum one between the value of the DAI and the size of the association set defined for the serving cell, and setting the multiple as a function of a transport block transmission mode of the UE for the serving cell.

4. The method of claim 3, wherein setting the multiple as the function of the transport block transmission mode of the UE comprises setting the multiple to one if the UE is configured with a single transport block transmission mode for the serving cell, and setting the multiple to two if the UE is configured with a two transport block transmission mode for the serving cell.

5. The method of claim 1, further comprising transmitting the HARQ feedback on a Physical Uplink Shared Channel (PUSCH) corresponding to the UL grant.

6. A User Equipment (UE) configured to generate Hybrid Automatic Repeat reQuest (HARQ) feedback for transmission in a wireless communication network, said UE comprising:
   a communications interface comprising a transceiver for communicating with the wireless communication network via an air interface; and
   a controller circuit operatively associated with the communications interface and configured to:
      receive a Downlink Assignment Index (DAI) in an Uplink (UL) grant for the UE, where the UE is operating according to a Carrier Aggregation (CA) configuration that aggregates a number of Time Division Duplex (TDD) cells of the wireless communication network as serving cells for the UE;

determine the number of HARQ feedback bits to generate for each serving cell based on a minimum one between the value of the DAI and the size of an association set for the serving cell, where the association set of each serving cell is defined by the Uplink/Downlink (UL/DL) configurations of the serving cells and indicates which DL subframes are associated with the HARQ feedback for the serving cell; and generate the HARQ feedback based on generating the determined number of HARQ feedback bits for each of the serving cells;

wherein the controller circuit is further configured to perform said generate and determine operations conditionally in dependence on subframe configuration values, so that HARQ feedback bits are not generated for any DL subframes having one or more defined special subframe configurations.

7. The UE of claim 6, wherein the controller circuit is configured to determine the number of HARQ feedback bits to generate for each serving cell by, for each serving cell, setting the number equal to the minimum one between the value of the DAI and the size of the association set defined for the serving cell.

8. The UE of claim 7, wherein the controller circuit is configured to determine the number of HARQ feedback bits to generate for each serving cell by, for each serving cell, setting the number equal to a multiple of the minimum one between the value of the DAI and the size of the association set defined for the serving cell, and setting the multiple as a function of a transport block transmission mode of the UE for the serving cell.

9. The UE of claim 8, wherein the controller circuit is configured to set the multiple as the function of the transport block transmission mode of the UE comprises setting the multiple to one if the UE is configured with a single transport block transmission mode for the serving cell, and setting the multiple to two if the UE is configured with a two transport block transmission mode for the serving cell.

10. The UE of claim 6, wherein the controller circuit is configured to transmit the HARQ feedback on a Physical Uplink Shared Channel (PUSCH) corresponding to the UL grant.

11. A non-transitory computer readable medium storing a computer program comprising instructions, which, when executed by a controller circuit in a User Equipment (UE), configure the UE to generate Hybrid Automatic Repeat reQuest (HARQ) feedback for transmission in a wireless communication network, based on configuring the UE to:

receive a Downlink Assignment Index (DAI) in an Uplink (UL) grant for the UE, where the UE is operating according to a Carrier Aggregation (CA) configuration that aggregates a number of Time Division Duplex (TDD) cells of the wireless communication network as serving cells for the UE;

determine the number of HARQ feedback bits to generate for each serving cell based on a minimum one between the value of the DAI and the size of an association set for the serving cell, where the association set of each serving cell is defined by the Uplink/Downlink (UL/DL) configurations of the serving cells and indicates which DL subframes are associated with the HARQ feedback for the serving cell; and generate the HARQ feedback based on generating the determined number of HARQ feedback bits for each of the serving cells;

wherein the computer program instructions further comprise instructions configuring the UE to perform said generate and determine operations conditionally in dependence on subframe configuration values, so that HARQ feedback bits are not generated for any DL subframes having one or more defined special subframe configurations.

* * * * *